US009411947B2

(12) United States Patent
Krstic et al.

(10) Patent No.: US 9,411,947 B2
(45) Date of Patent: Aug. 9, 2016

(54) METHOD FOR MANAGING SECURITY OF A DATA PROCESSING SYSTEM WITH CONFIGURABLE SECURITY RESTRICTIONS

(71) Applicant: Apple Inc., Cupertino, CA (US)

(72) Inventors: Ivan Krstic, Sunnyvale, CA (US); Pierre-Olivier J. Martel, Mountain View, CA (US); Gregory Daniel Hughes, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,711

(22) Filed: May 30, 2014

(65) Prior Publication Data

US 2015/0347741 A1     Dec. 3, 2015

(51) Int. Cl.
*G06F 21/32*     (2013.01)
(52) U.S. Cl.
CPC ........ *G06F 21/32* (2013.01); *G06F 2221/2133* (2013.01)
(58) Field of Classification Search
None
See application file for complete search history.

(56) References Cited

U.S. PATENT DOCUMENTS

| 7,552,467 | B2 | 6/2009 | Lindsay |
| 8,146,138 | B2 | 3/2012 | Chen et al. |
| 2002/0116542 | A1* | 8/2002 | Tarbotton et al. ............. 709/318 |
| 2005/0289353 | A1* | 12/2005 | Dahlke .................... 713/182 |
| 2006/0212407 | A1 | 9/2006 | Lyon |
| 2007/0143624 | A1* | 6/2007 | Steeves .................... 713/182 |
| 2008/0120499 | A1* | 5/2008 | Zimmer et al. .............. 713/2 |
| 2008/0252493 | A1* | 10/2008 | Cho et al. ..................... 341/22 |
| 2011/0023110 | A1 | 1/2011 | Freund et al. |
| 2011/0292031 | A1 | 12/2011 | Zhu et al. |

* cited by examiner

*Primary Examiner* — David Le
(74) *Attorney, Agent, or Firm* — Blakely, Sokoloff, Taylor & Zafman LLP

(57) ABSTRACT

Techniques for managing security of a data processing system are described herein. According to one embodiment, in response to a request for modifying a security settings of a data processing system, a message is displayed on a display of the data processing system to request a user who operates the data processing system to perform a physical action to prove that the user was physically present to issue the request for modifying the security settings. It is verified whether a user action physically performed by the user conforms to the requested physical action. The security settings of the data processing system is modified, in response to determining that the user action conforms to the requested physical action.

23 Claims, 8 Drawing Sheets

METHOD FOR MANAGING SECURITY OF A DATA PROCESSING SYSTEM WITH CONFIGURABLE SECURITY RESTRICTIONS

FIELD OF THE INVENTION

Embodiments of the present invention relate generally to security of an operating system of a data processing system. More particularly, embodiments of the invention relate to securely handling modification of security settings of an operating system.

BACKGROUND

Security concerns for all types of processor-based electronic devices, and particularly for computing devices, have become a significant concern. While some concerns may relate to detrimental actions which may be undertaken by defective code implemented by such devices, the greater concerns relate to the ramifications of various types of attacks made upon such devices through malicious code, including code conventionally known in the field by a number of names, including "viruses," "worms," "Trojan horses," "spyware," "adware," and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are directed at computing devices, such as workstations, servers, desktop computers, notebook and handheld computers, and other similar devices. Many of these computing devices can run one or more application programs which a user may operate to perform a set of desired functions. However, such attacks are not limited to such computing devices. A broader group of various types of devices, such as cell phones; personal digital assistants ("PDA's"); music and video players; network routers, switches or bridges; and other devices utilizing a microprocessor, microcontroller, or a digital signal processor, to execute coded instructions have been the subjects of attacks by malicious code.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code. However, most of these techniques are ineffective if the malware gains access or operating privilege (e.g., root privilege or administrative privilege).

For example, in a conventional operating system, once the malware gains certain accessing privilege, such as root or administrative privilege, it can cause significant damage to the system. One of the most significant damage will be modify certain security settings of certain system components or applications running within an operating system, which in turn destroys all or most of the security measures of the system. There has been a lack of efficient security prevention mechanisms to prevent such malware even if it gained the necessary accessing privileges.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
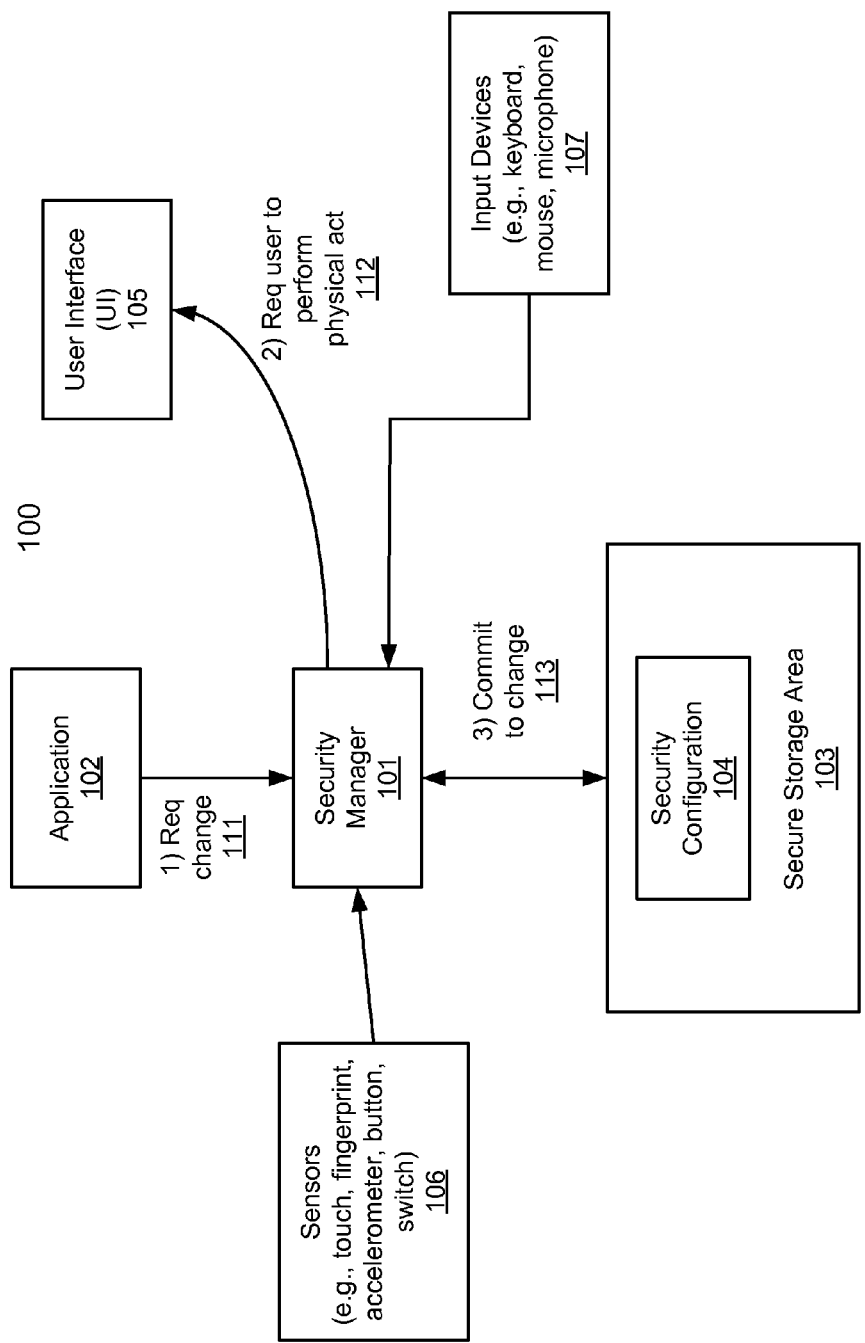
FIG. 1 is a block diagram illustrating a security system architecture of a data processing system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when an application or process attempts to modify the security settings of an application and/or an operating system, a security manager or system of the operating system is to verify or ensure that the request for modifying the security setting was indeed physically initiated by a user, instead of a robot (e.g., bots). In one embodiment, the security manager of the operating system prompts or requests the user to perform a physical action that can only be performed by a physical human being. In response to an action performed by the user, the security system compares the action with a predetermined action. If the action performed by the user conforms to the predetermined action it anticipates, the security manager may allows the user to modify the security settings.

In one embodiment, in response to a request for modifying the security settings of an application or an operating system running within a data processing system, the security manager causes the data processing system to reboot. During the reboot and before a kernel of the operating system finishes its rebooting, a message is presented to a user, where the message includes therein a secret code. The message further requests the user to memorize the secret code. After the operating system has been completely rebooted, the user makes a second attempt to modify the security settings. In response to the request for modifying the security settings again, the security manager prompts the user to reenter the secret code that was presented earlier during the reboot. Once the user reenters the secret code and the reentered secret code is verified by the security manager, the user is then allowed to modify the security settings. Thus, the requirement of rebooting the system, memorizing the secret code during reboot, and reentering secret code in the second attempt, the system can confidently verify that the user is physically present and performs such actions. Since the secret code is presented during an early stage of the reboot (e.g., prior to completely rebooting the kernel of the operating system), it is unlikely a malware can intercept and capture the secret code. Therefore, the security system of the operating system is confident that the attempt to modify the security settings is indeed initiated from a human being instead of bots or malware.

According to another embodiment, instead of rebooting the system, in response to a request for modifying a security configuration, the security manager displays a string of characters and/or code in a CAPTCHA (Completely Automated Public Turing test to tell Computers and Human beings Apart) form that only a human being can recognize it. The security manager prompts the user to reenter the string of characters and/or code in an input field. Once the reentered string of characters and/or code has been verified by the security manager, the user is allowed to modify the security settings. Since the above actions require a user to physically perform, a malware cannot in personate the physical user in order to modify the security settings, even if the malware somehow obtained a high level of accessing privileges (e.g., root or administrative privilege).

FIG. 1 is a block diagram illustrating a security system architecture of a data processing system according to one embodiment of the invention. Referring to FIG. 1, system 100 represents any kind of data processing systems, such as, for example, a server, a desktop, a laptop, a tablet, or a mobile phone, etc. System 100 includes security manager 101 for managing security configuration 104 for a variety of clients, such as application 102, executed within system 100 by processing resources (not shown). Processing resources may present one or more processors or processor cores. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. A processor may be a general-purpose processor such as a central processing unit (CPU).

Security manager 101 may be a part of an operating system (OS) running and executed by the processing resources within system 100. An operating system is a collection of software that manages computer hardware resources and provides common services for computer programs. The operating system is an essential component of the system software in a computer system. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service. In addition to security manager 101, an operating system may further include other core components, such as a scheduler, a device manager, a kernel, etc. In order not to unnecessarily obscure embodiments of the present invention, these components are not shown herein. The operating system of system 100 may be any kind of operating systems, such as, for example, iOS™ from Apple®, Android™ from Google®, Windows™ from Microsoft®, or other operating systems (e.g., UNIX, LINUX, real-time or embedded operating systems).

According to one embodiment, when an application 102 attempts to modify security settings or configuration 104, it sends a request for modifying security settings via path 111 to security manager 101. In this example, application 102 may or may not be malware, application 102 may any of applications currently installed in the operating system. Alternatively, application 102 may be a malware or an application that has been infected or hijacked by malware. Security configuration 104 may be the security configuration of application 102 itself, a security settings of another application, and/or a security settings of a system component, such as an operating system component or hardware component of the data processing system.

Typically, security settings 104 is protected and stored in a secure storage location or area of a persistent storage device or remote server via a secure connection of the data processing system. For example, security settings 104 may be protected using a variety of encryption techniques and stored in a hidden storage area of a storage device that only the corresponding application 102 or the kernel of the operating system would know. A request for modifying a security settings of application 102 (e.g., browser) may be to give a permission to allow another application to access data associated with application 102 (e.g., browser history). In another example, application 102 may be an email or contact application and a request for modifying the security settings is to permitting another application (e.g., social media application) to access the contacts or email history of application 102. If malware gains a certain accessing privilege level such as a root or administrative privilege level, it can gain control of application 102 or impersonate application 102 to modify the security settings 104 to access the privileged data of the application. Similarly, malware can also modify the security settings of the operating system to take over the control of the operating system.

According to one embodiment, in response to the request for modifying security settings 104 received via path 111, security manager 101 requests via path 112 and user interface 105 a user who operating the data processing system to perform a physical act that only a human can perform. In one embodiment, security manager 101 may cause the operating system to reboot and during an early stage of the reboot, a message having a secret code is displayed on user interface to prompt the user to memorize the secret code being displayed and to attempt to modify the security settings again after the reboot has completed. For example, the message can be displayed prior to the kernel of the operating system has been completely loaded and before any of the user level applications or third-party kernel components (e.g., device drivers) are loaded. Subsequently after the operating system has been completed loaded, the user should make a second attempt to modify the security settings and the system will prompt the user to reenter the secret code the user obtained during the reboot. If the reentered secret code is verified, the user is allowed to modify security settings 104 via path 113.

According to another embodiment, instead of rebooting the system, a string of characters and/or codes (e.g., letters, characters, numbers, or a combination thereof) may be displayed in a CAPTCHA form that only a human can recognize it. The system prompts the user to reenter the string in the CAPTCHA form in a predetermined input field. If the reentered string is verified, the user is allowed to modify the security settings. Note that the above described scenarios are describe for illustration purpose only; other physical acts may also be utilized. For example, security manager 101 may request the user to press a particular button, flip a particular switch, touch a particular area of a touch screen or fingerprint reader, physically move the data processing system, in this example, a mobile device, in a particular direction, or a combination thereof. These physical acts can be detected by a variety of corresponding sensors 106. Alternatively, security manager 101 may request the user to press a particular keystroke on a keyboard, click a particular button of a mouse, speak to a microphone a particular phrase, or a combination thereof, which may be detected by one or more input devices 107. Furthermore, security manager 101 may display a message via user interface to prompt the user to launch a particular application and perform a particular action within that application, etc. A combination of at least some of the above actions can be performed to prove or verify that the user is physically present to initiate the request for modifying the security settings. Such actions are unlikely performed or impersonated by malware.

Figure 2:
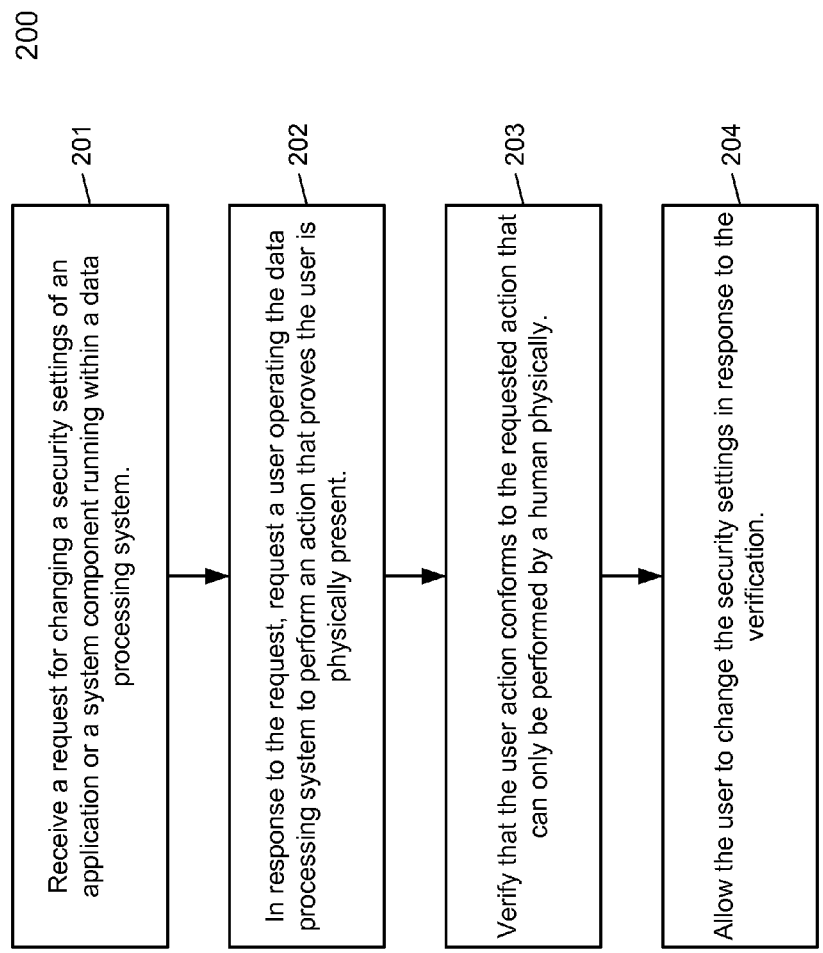
FIG. 2 is a flow diagram illustrating a method for handling modification of security settings according to one embodiment of the invention.

FIG. 2 is a flow diagram illustrating a method for handling modification of security settings according to one embodiment of the invention. Method 200 may be performed by processing logic which may include software, hardware, or a combination thereof. For example, method 200 may be performed by system 100 of FIG. 1. Referring to FIG. 2, at block 201, processing logic receives a request for modifying the security settings. The request may be received from an application to modify its own security settings, to modify the security settings of another application, or to modify the security settings of a system component of an operating system of a data processing system. In response to the request, at block 202, processing logic requests a user operating the data processing system to perform an action (e.g., physical action) that proves the user is physically present. The requested action can be any one or more of the actions described above with respect to FIG. 1. At block 203, processing logic verifies the action performed by the user conforms to the requested action that can only be performed by a human physically. At block 204, if the action is verified, the requested security settings are modified accordingly.

Figure 3A:
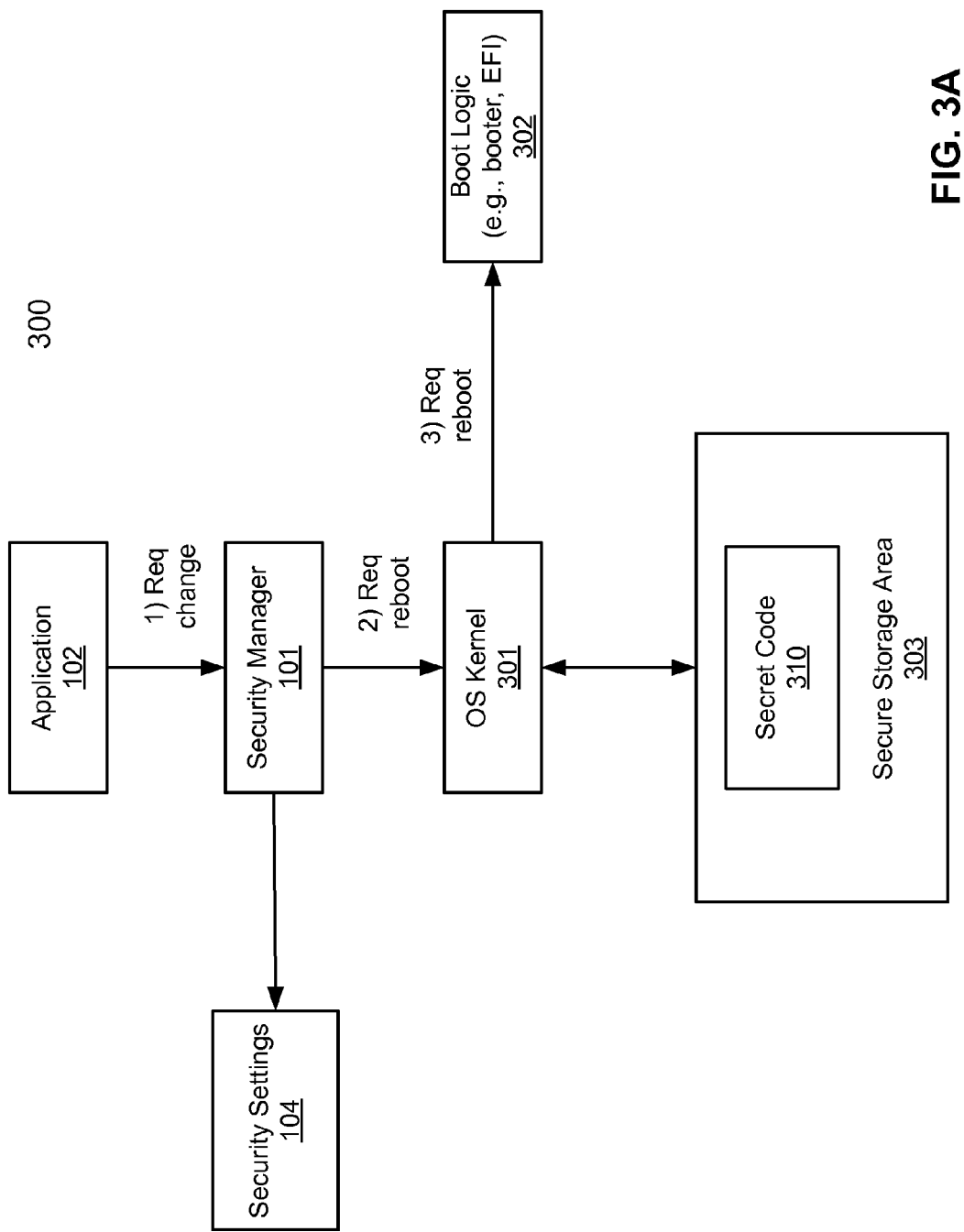
FIGS. 3A-3B are block diagrams illustrating a security system architecture of a data processing system according to another embodiment of the invention.
Figure 3B:
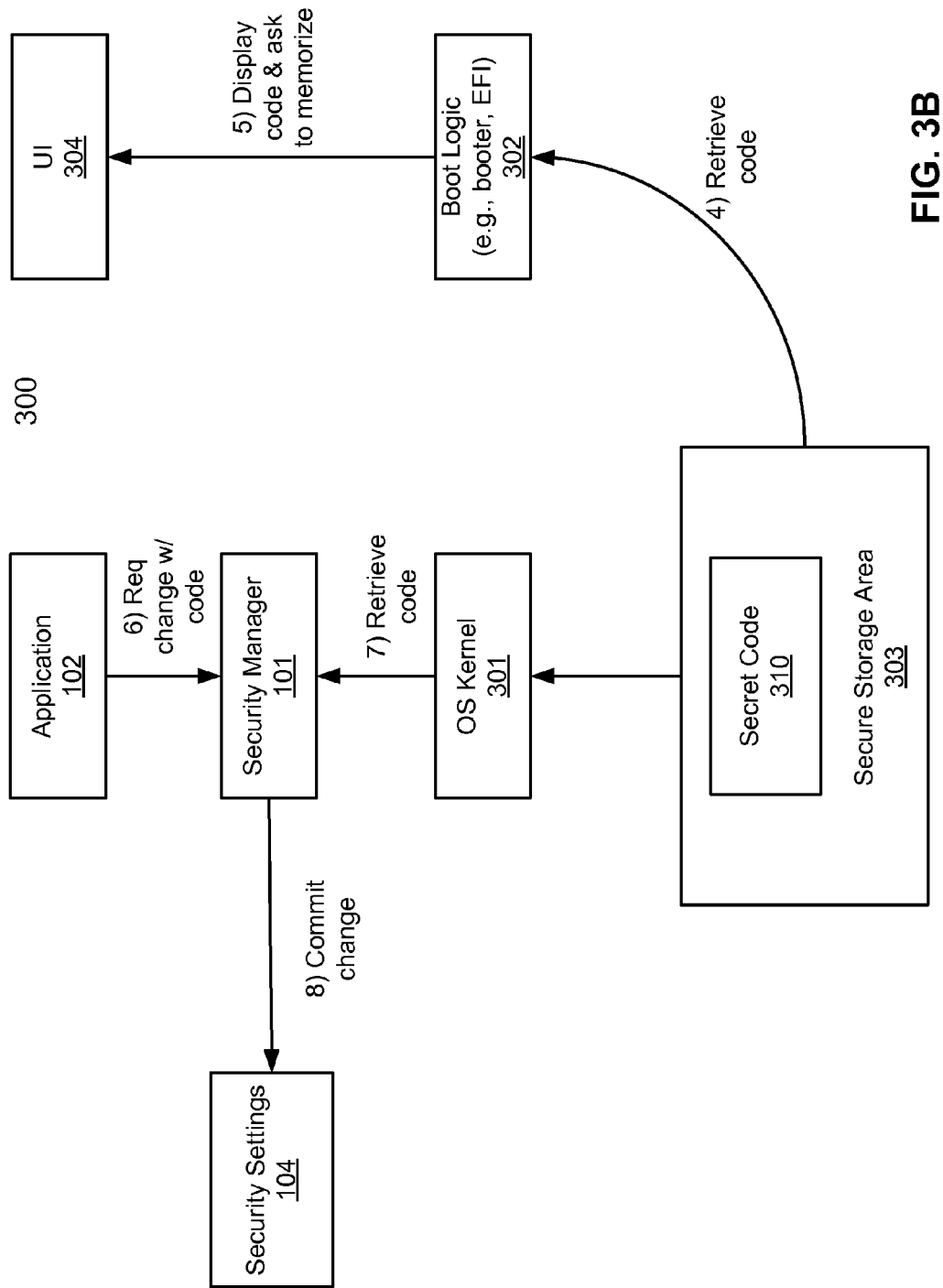

FIGS. 3A-3B are block diagrams illustrating a security system architecture of a data processing system according to another embodiment of the invention. System 300 may be implemented as part of system 100 of FIG. 1. Referring to FIG. 3A, in response to a request from application 102 for modifying security settings 104, security manager 101 sends a request for rebooting to an operating system (OS) kernel 301. OS kernel then instructs boot logic 302 of the operating system to reboot the machine for the purpose of modifying a security configuration. Prior to rebooting the data processing system, according to one embodiment, secret code 310 is generated or obtained to be stored at secure storage area 303. Alternatively, a static secret code may be maintained and stored in secure storage area, as long as secret code is protected.

In response to the request for reboot, boot logic 302 causes the operating system to reboot. Referring now to FIG. 3B, during the reboot according to one embodiment, boot logic 302 retrieves secret code 310 from secure storage area 303 and displays secret code 310 in a user interface 304 and prompts a user (if present) to memorize the displayed secret code for the purpose of modifying security settings 104. In one embodiment, secret code 310 may be displayed during an early stage of the reboot. Typically, a boot process starts with an EFI (extensible firmware interface) or BIOS (basic input and output system) stage, the boot loader, the OS kernel, and then rest of the user space software components of the OS. In one embodiment, secret code 310 is retrieved from secure storage area 303 an displayed in UI 304 within any of the early booting stages prior to completely loading the OS kernel. As a result, it is unlikely that any malware can capture the secret code and only a human can memorize the displayed secret code.

Note that boot logic 302 may have to detect whether and/or when to display secret code 310 during the reboot. In one embodiment, when OS kernel 301 instructs boot logic 302 to reboot, boot logic 302 may store a flag (not shown) in a persistent secure storage location for such an indication. When rebooting, boot logic 302 will check whether the flag has been set to a predetermined value. If so, boot logic 302 retrieves secret code 310 from secure storage area 303 and displays the secret code in UI 304. Otherwise, if the flag has not been set to the predetermined value, boot logic 302 may boot the operating system as usual without displaying the secret code.

Alternatively, since OS kernel 301 generates code 310 and stores secret code 310 in secure storage area 303 each time when a request for modifying a secure settings is received (e.g., new secret code for each attempt to modify the security settings), the presence of secret code 310 can be used as an indication by boot logic 302. Thus, during the reboot, boot logic 302 examines secure storage area 303 to determine whether secret code 310 exists. If it does, boot logic 302 retrieves secret code 310 and displays it in UI 304.

After the operating system has been completed rebooted, the user (or malware) issues a second request to modify security settings 104. In one embodiment, after the reboot, the user may launch application 102 and make a second attempt to modify security settings 104. In response to the second request, security manager 101 prompts the user to reenter in a predetermined field the secret code displayed during the reboot. Once the user reenters the secret code, security manager 101 retrieves via OS kernel 301 secret code 310 from secure storage area 303 and compares with the one reentered by the user. If both secret code 310 and the secret code reentered by the user match, security manager 101 then commits the modification of security settings 104. Thus, when a request for modifying the security settings is received, the request is deferred until the system is rebooted to verify that the request was indeed received from a user physically.

Note that secure storage area 303 needs to be a highly secure place to prevent any malware or software program that is not authorized to access content stored in secure storage area 303. If secure storage area 303 is compromised, secret code 310 may be obtained. In one embodiment, secure storage area 303 and boot logic 302 may be implemented as part of a secure enclave processor (SEP), a separate co-processor, within the data processing system for the sole purpose of maintaining security of the data processing system. The SEP processor uses a secure boot process to ensure that is separate software is both verified and signed by a proper authority, such as Apple Inc. All secure enclaves can function independently even if a kernel of the operating system is compromised and each contains a unique identifier inaccessible to other parts of the system to prevent others from accessing the data contained within.

In this embodiment, during the reboot, the SEP processor may generate secret code 310 and displays it in UI. In response to a second attempt to modify security settings 104 after the reboot, the SEP processor is to prompt the use to reenter the secret code again and the SEP processor is to verify the reentered code. If the reentered code is verified, the SEP notifies security manager 101 to allow security manager 101 to commit the modification of secure settings 104.

Figure 4:
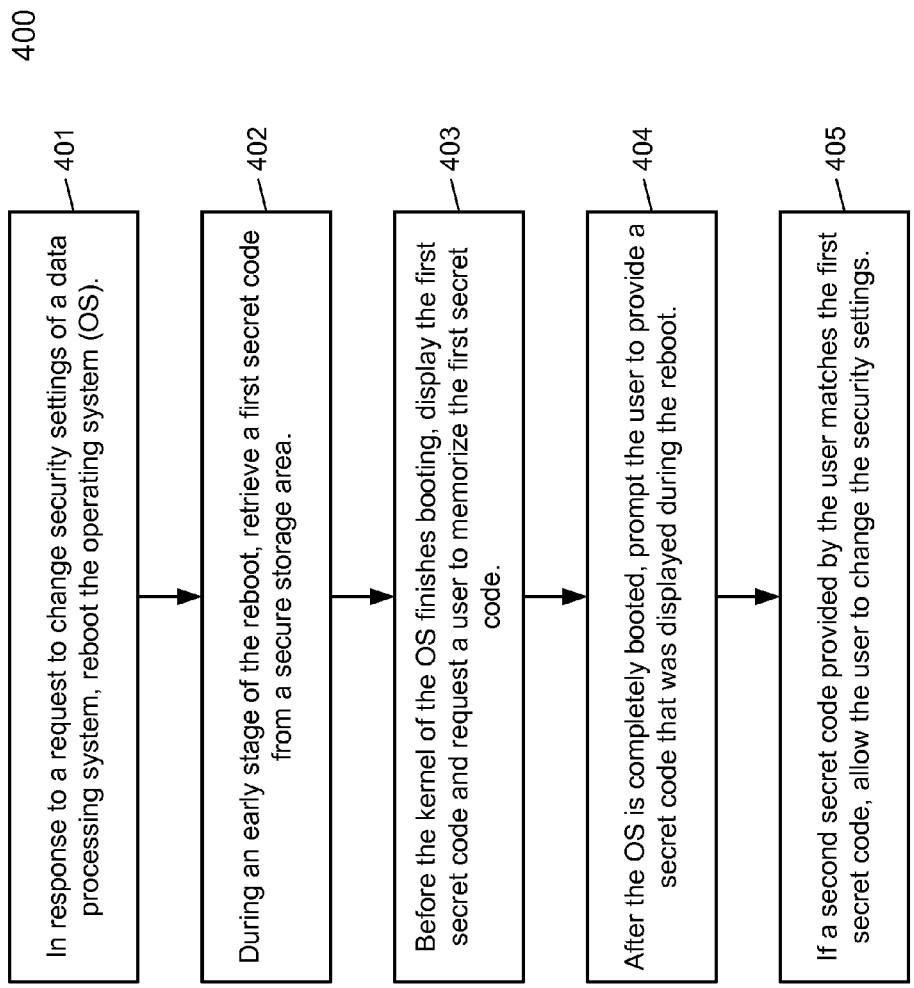
FIG. 4 is a flow diagram illustrating a method for modifying security settings according another embodiment of the invention.

FIG. 4 is a flow diagram illustrating a method for modifying security settings according another embodiment of the invention. Method 400 may be performed by processing logic which may include software, hardware, or a combination thereof. For example, method 200 may be performed by system 300 of FIGS. 3A-3B. Referring to FIG. 4, at block 401, in response to a request for modifying the security settings of a data processing system, the data processing system is rebooted. At block 402, during an early stage of the reboot, processing logic retrieves a first secret code from a secure storage location. At block 403, before the kernel of an operating system finishes booting, processing logic displays the first secret code and requests a user to memorize the first secret code. After the OS has been completely rebooted, processing logic prompts the user to reenter the secret code that was displayed during the reboot. At block 405, if a second secret code entered by the user matches the first secret code, the user is allowed to modify the security settings.

Figure 5:
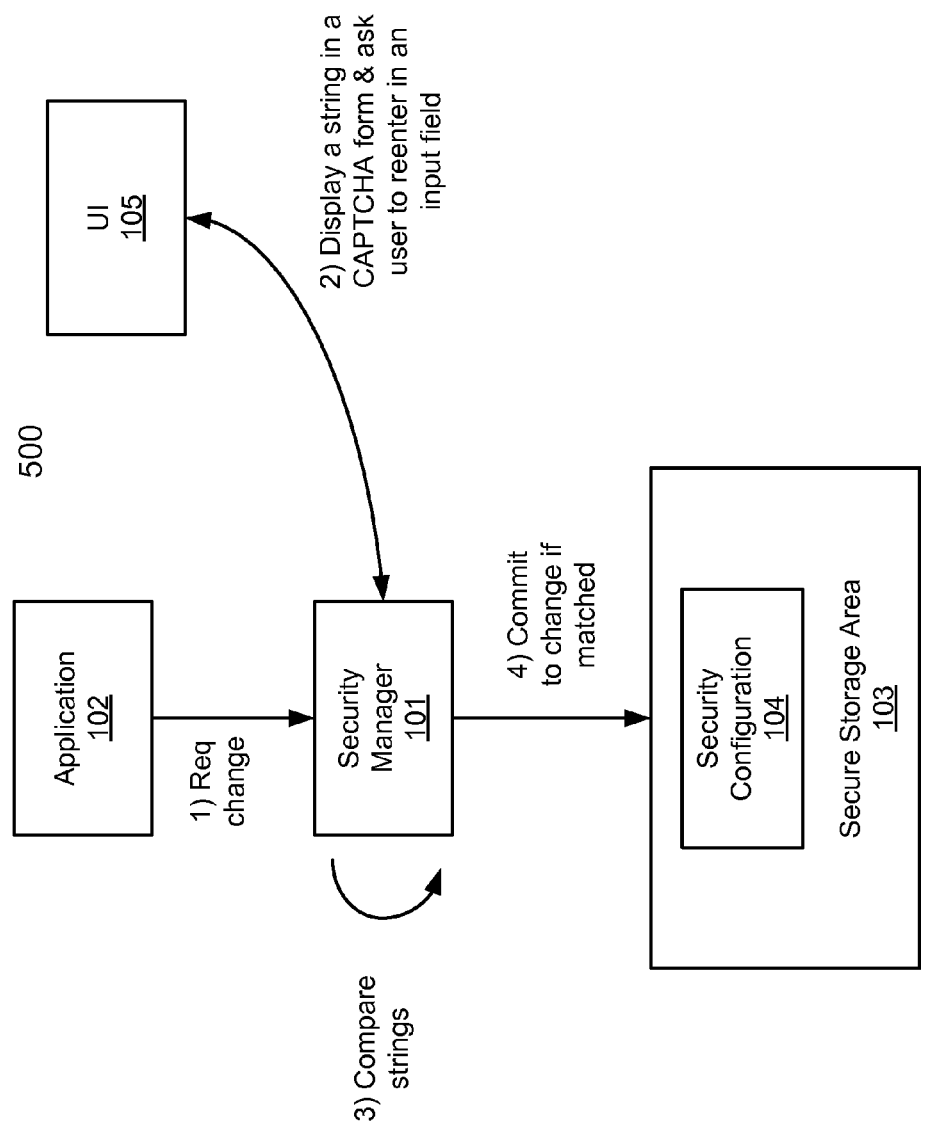
FIG. 5 is a block diagram illustrating a security system architecture of a data processing system according to another embodiment of the invention.

According to another embodiment, referring now to FIG. 5, instead of rebooting system 500, in response to a request for modifying a security configuration from application 102, security manager 101 displays a string of characters and/or code in a CAPTCHA form via UI 105 that only a human can recognize it. The security manager 101 prompts the user to reenter the string of characters and/or code in a predetermined input field. Once the reentered string of characters and/or code has been verified by the security manager 101, the user is allowed to modify the security settings 104 stored in secure storage area 103. Since the above actions require a user to physically perform, a malware cannot in personate the physical user in order to modify the security settings, even if the malware somehow obtained a high level of accessing privileges (e.g., root or administrative privilege).

Figure 6:
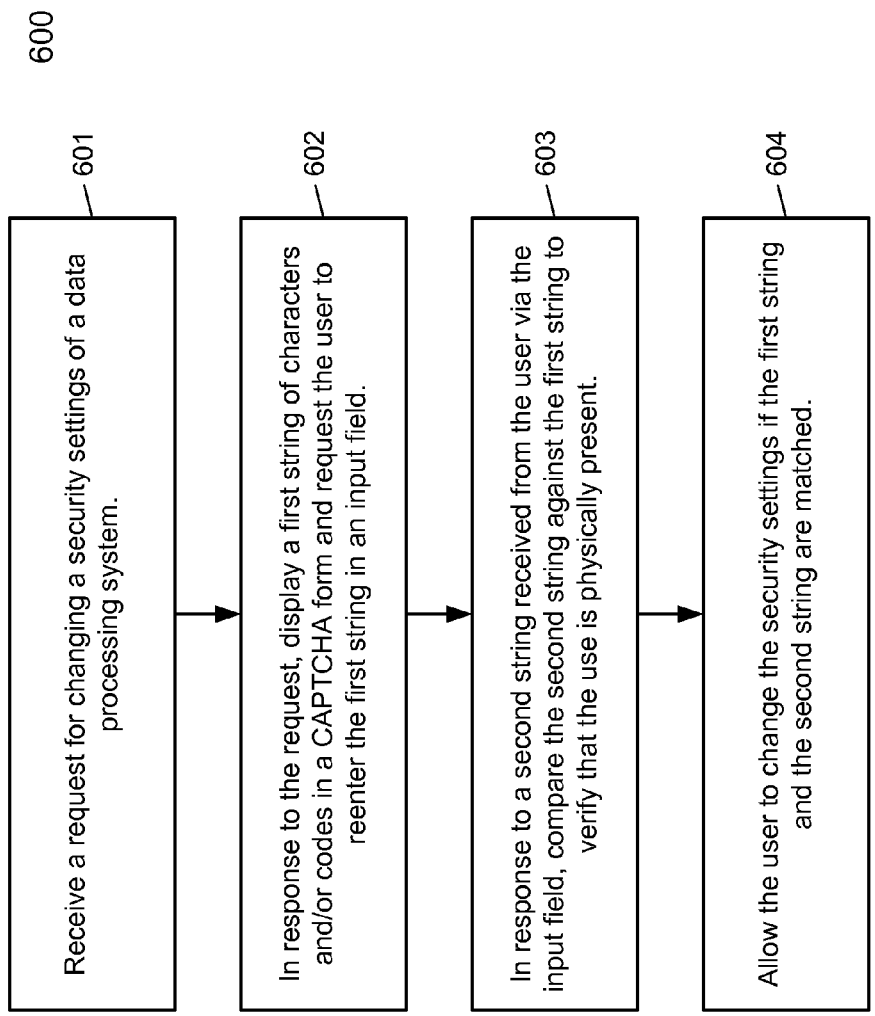
FIG. 6 is a flow diagram illustrating a method for handling modification of security settings according to another embodiment of the invention.

FIG. 6 is a flow diagram illustrating a method for modifying security settings according another embodiment of the invention. Method 600 may be performed by processing logic which may include software, hardware, or a combination thereof. For example, method 500 may be performed by system 500 of FIG. 5. Referring to FIG. 6, at block 601, processing logic receives a request for modifying the security settings of a data processing system. At block 602, in response to the request, processing logic displays a first string of characters and/or codes in a CAPTCHA form and requests a user to reenter the first string in a predetermined input field. In response to a second string received from the user via the input field, at block 603, the first string and the second string are compared to verify that the use is physically present. At block 604, if the first and second strings match, the user is allowed to modify the security settings.

Figure 7:
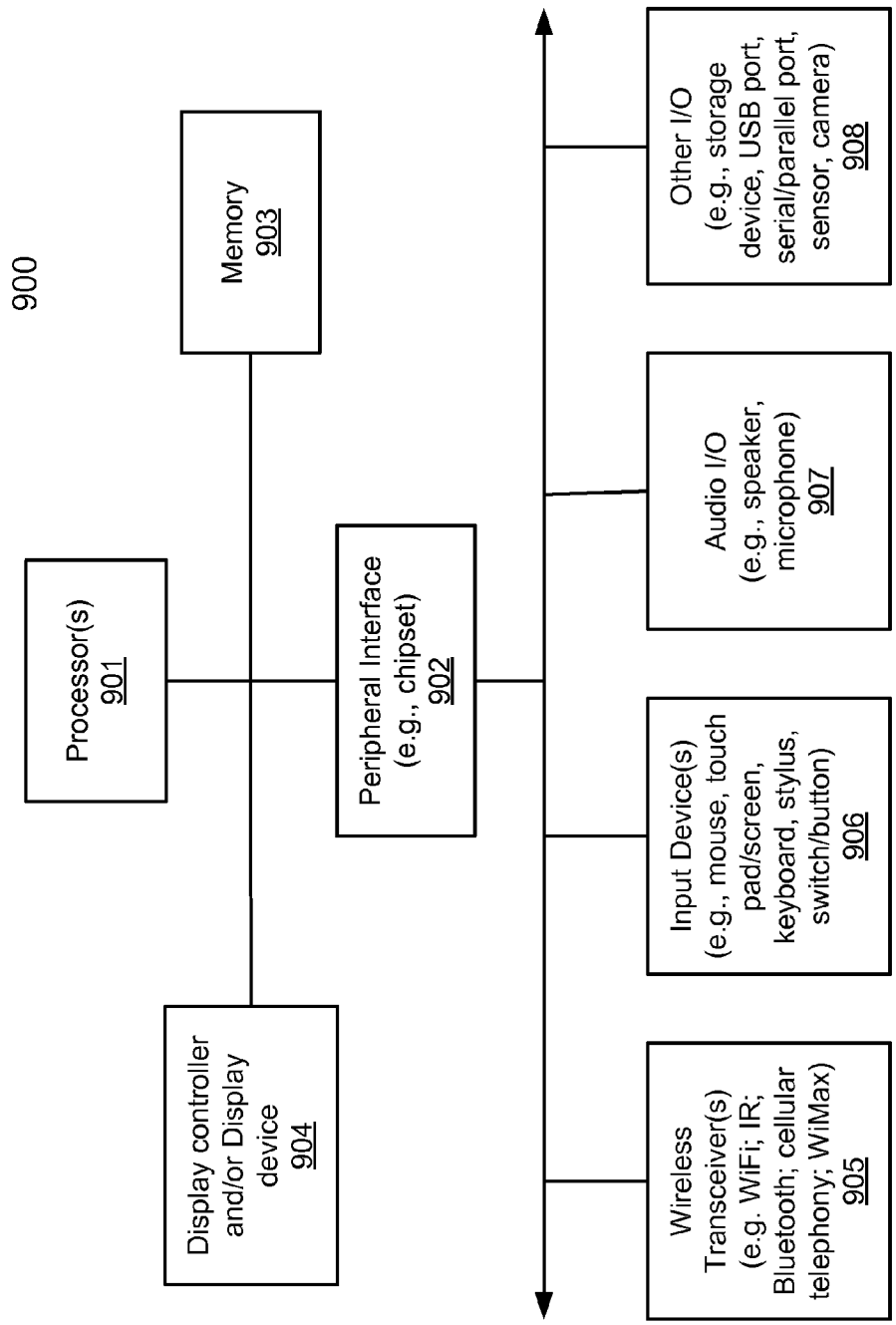
FIG. 7 is a block diagram illustrating an example of a data processing system which may be used with one embodiment of the invention.

FIG. 7 is a block diagram illustrating an example of a data processing system which may be used with one embodiment of the invention. For example, system 900 may represents any of data processing systems described above performing any of the processes or methods described above. System 900 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 7, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 7 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   booting a data processing device;
   in response to receiving a request from an application for modifying a security settings of a data processing system:
   rebooting the data processing system, including rebooting a kernel of an operating system of the data processing device;
   before the kernel of the operating system has finished rebooting, displaying a message on a display of the data processing system to request a user who operates the data processing system to perform a physical action specified in the displayed message to prove that the user was physically present to issue the request for modifying the security settings;
   in response to receiving an action physically performed by the user, verifying whether the action physically performed by the user conforms to the requested physical action specified in the displayed message; and
   modifying the security settings of the data processing system in response to determining that the user action conforms to the requested physical action specified in the displayed message.

2. The method of claim 1, further comprising:
   retrieving a first secret code from a secure storage location of the data processing system, and
   including the first secret code within the message to be displayed as part of the message, wherein the physical action specified in the displayed message comprises entering the first secret code.

3. The method of claim 2, wherein the secure storage comprises a secure enclave processor.

4. The method of claim 1, further comprising:
generating, by the data processing device, a secret code, wherein the physical action specified in the displayed message comprises entering the secret code.

5. The method of claim 4, further comprising:
storing the secret code in a secure memory of the data processing system; and
determining, by boot logic of the data processing system, whether the secret code is to be displayed in the message displayed to the user after the reboot.

6. The method of claim 1, further comprising:
generating a first secret code; and
including the first secret code in the message, wherein the first secret code is displayed in a CAPTCHA form as part of the message.

7. The method of claim 6, further comprising:
prompting the user via the displayed message to reenter in an input field the first secret code that is displayed in the CAPTCHA form;
in response to receiving a second secret code via the input field, comparing the first secret code with the second secret code; and
verifying the user is physically present if the first secret code and the second secret code are matched.

8. The method of claim 1, wherein the requested physical action comprises a physical touch action detected by at least one of a sensor, a button, and a switch attached to the data processing system.

9. The method of claim 1, wherein the requested physical action comprises at least one of one or more keystrokes on a keyboard, one or more clicks of a mouse, and a voice stream recorded by a voice recorder.

10. A non-transitory machine-readable medium having instructions stored therein, which when executed by a processor, cause the processor to perform a method, the method comprising:
booting a data processing device;
in response to receiving a request from an application for modifying a security settings of a data processing system:
rebooting the data processing system, including rebooting a kernel of an operating system of the data processing device;
before the kernel of the operating system has finished rebooting, displaying a message on a display of the data processing system to request a user who operates the data processing system to perform a physical action specified in the displayed message to prove that the user was physically present to issue the request for modifying the security settings;
in response to receiving an action physically performed by the user, verifying whether the action physically performed by the user conforms to the requested physical action specified in the displayed message; and
modifying the security settings of the data processing system in response to determining that the user action conforms to the requested physical action specified in the displayed message.

11. The non-transitory machine-readable medium of claim 10, wherein the method further comprises:
retrieving a first secret code from a secure storage location of the data processing system, and
including the first secret code within the message to be displayed as part of the message, wherein the physical action specified in the message comprises entering a first secret code.

12. The non-transitory machine-readable medium of claim 10, wherein the secure storage comprises a secure enclave processor.

13. The non-transitory machine-readable medium of claim 10, wherein the method further comprises:
generating, by the data processing device, a secret code, wherein the physical action specified in the displayed message comprises entering the secret code.

14. The non-transitory machine-readable medium of claim 13, further comprising:
storing the secret code in a secure memory of the data processing system; and
determining, by boot logic of the data processing system, whether the secret code is to be displayed in the message displayed to the user after the reboot.

15. The non-transitory machine-readable medium of claim 10, wherein the method further comprises:
generating a first secret code; and
including the first secret code in the message, wherein the first secret code is displayed in a CAPTCHA form as part of the message.

16. The non-transitory machine-readable medium of claim 15, further comprising:
prompting the user via the displayed message to reenter in an input field the first secret code that is displayed in the CAPTCHA form;
in response to receiving a second secret code via the input field, comparing the first secret code with the second secret code; and
verifying the user is physically present if the first secret code and the second secret code are matched.

17. The non-transitory machine-readable medium of claim 10, wherein the requested physical action comprises a physical touch action detected by at least one of a sensor, a button, and a switch attached to the data processing system.

18. The non-transitory machine-readable medium of claim 10, wherein the requested physical action comprises at least one of one or more keystrokes on a keyboard, one or more clicks of a mouse, and a voice stream recorded by a voice recorder.

19. A data processing system, comprising:
a processor; and
a memory coupled to the processor for storing instructions, which when executed from the memory, cause the processor to perform operations, the operations including:
booting a data processing device;
in response to receiving a request from an application for modifying a security settings of a data processing system:
rebooting the data processing system, including rebooting a kernel of an operating system of the data processing device;
before the kernel of the operating system has finished rebooting, displaying a message on a display of the data processing system to request a user who operates the data processing system to perform a physical action specified in the displayed message to prove that the user was physically present to issue the request for modifying the security settings,
in response to receiving an action physically performed by the user, verifying whether the action physically performed by the user conforms to the requested physical action specified in the displayed message, and
modifying the security settings of the data processing system in response to determining that the user action conforms to the requested physical action specified in the displayed message.

20. The system of claim 19, wherein the operations further comprise:
retrieving a first secret code from a secure storage location of the data processing system, and
including the first secret code within the message to be displayed as part of the message, wherein the physical action specified in the displayed message comprises entering the first secret code.

21. The method of claim 20, wherein the secure storage comprises a secure enclave processor.

22. The method of claim 19, wherein the operations further comprise:
generating, by the data processing system, a secret code, wherein the physical action specified in the displayed message comprises entering the secret code.

23. The method of claim 22, further comprising:
storing the secret code in a secure memory of the data processing system; and
determining, by boot logic of the data processing system, whether the secret code is to be displayed in the message displayed to the user after the reboot.

* * * * *